(12) United States Patent
Naganuma et al.

(10) Patent No.: US 6,277,461 B1
(45) Date of Patent: Aug. 21, 2001

(54) OPTICAL RECORDING MEDIUM

(75) Inventors: Hiroyuki Naganuma; Naoki Shimada, both of Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/331,732

(22) PCT Filed: Oct. 28, 1998

(86) PCT No.: PCT/JP98/04883

§ 371 Date: Jun. 24, 1999

§ 102(e) Date: Jun. 24, 1999

(87) PCT Pub. No.: WO99/22370

PCT Pub. Date: May 6, 1999

(30) Foreign Application Priority Data

Oct. 28, 1997 (JP) .................................................. 9-295624

(51) Int. Cl.⁷ ........................................................ B32B 3/02
(52) U.S. Cl. ...................... 428/64.1; 428/64.2; 428/64.4; 428/913; 430/270.11; 430/495; 430/945; 235/457
(58) Field of Search ..................... 428/64.1, 64.2, 428/64.4, 457, 913; 430/270.11, 495.1, 945; 235/380, 454, 457

(56) References Cited

U.S. PATENT DOCUMENTS

| | | | |
|---|---|---|---|
| 5,972,457 | * 10/1999 | Matsuishi | 428/64.1 |
| 6,001,444 | * 12/1999 | Koide | 428/64.1 |
| 6,098,889 | * 8/2000 | Ogawa | 235/492 |

FOREIGN PATENT DOCUMENTS

| | | |
|---|---|---|
| 62-279531 | 12/1987 | (JP) . |
| 7-500938 | 1/1995 | (JP) . |
| 8-235639 | 9/1996 | (JP) . |
| 9-17038 | 1/1997 | (JP) . |
| 93/08565 | 4/1993 | (WO) . |

* cited by examiner

*Primary Examiner*—Elizabeth Evans
(74) *Attorney, Agent, or Firm*—Parkhurst & Wendel, LLP

(57) ABSTRACT

There is provided an optical recording medium provided with at least an optical recording layer, further comprising a cured layer provided on/over outer surface of the optical recording layer and a receiving layer provided on at least a part of the cured layer. It is possible to provide an optical recording medium which allows post-processing such as printing on the cured layer which has been very difficult to be carried out so far, without degrading the reliability of the information of the optical recording medium.

16 Claims, 3 Drawing Sheets

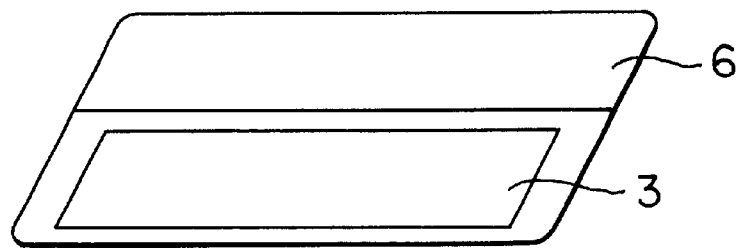
F I G. 6
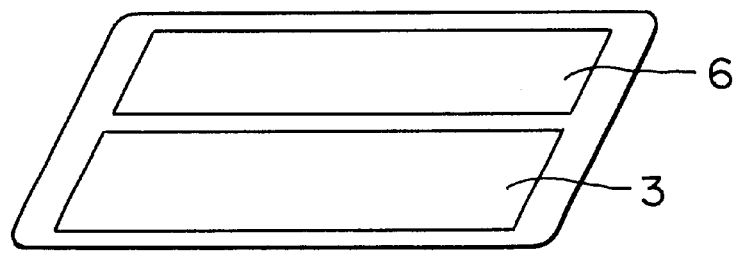
F I G. 7
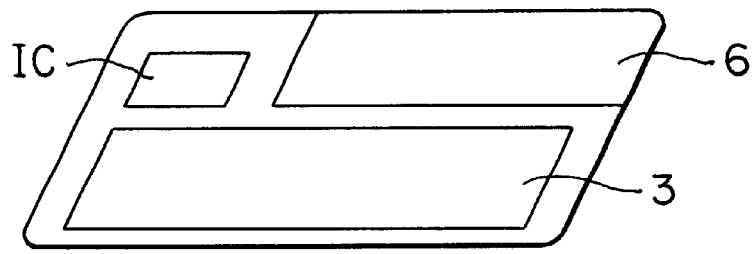
F I G. 8
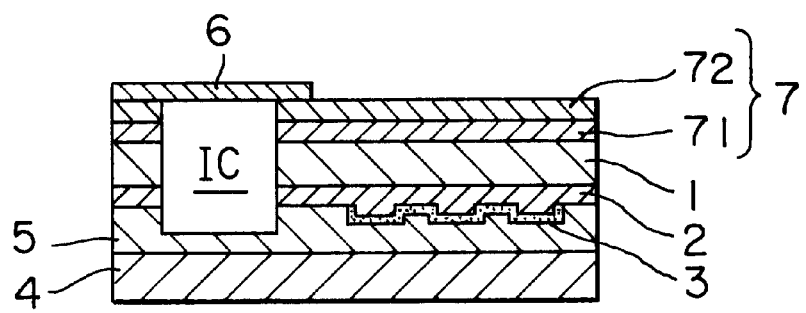
F I G. 9

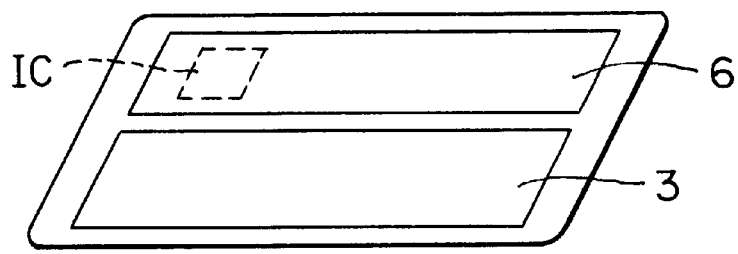
F I G. 10
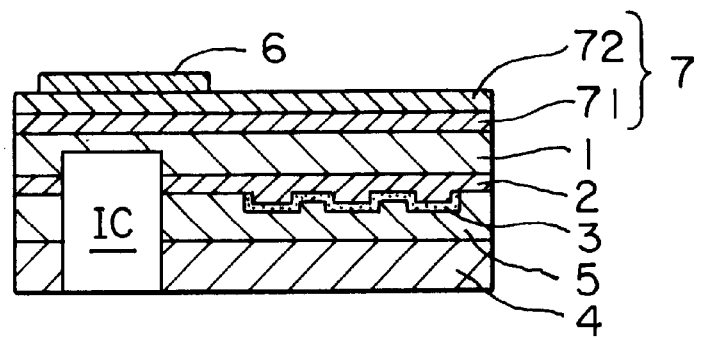
F I G. 11
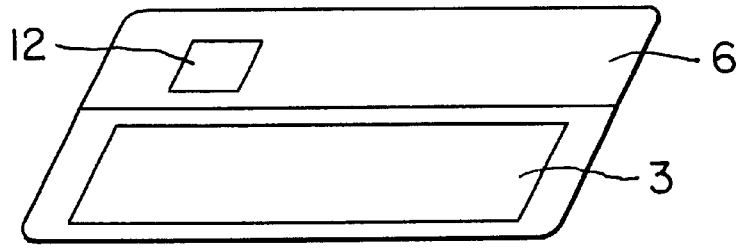
F I G. 12
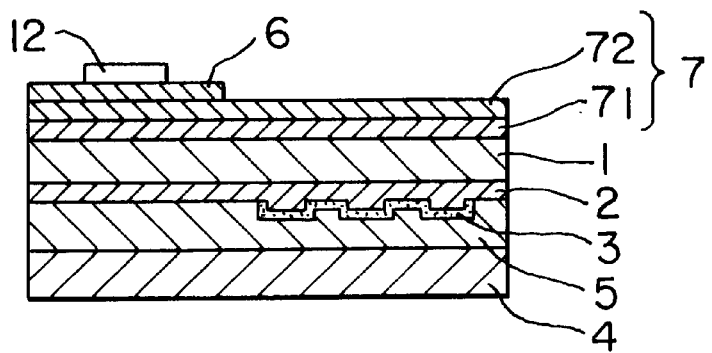
F I G. 13

OPTICAL RECORDING MEDIUM

TECHNICAL FIELD

The present invention relates to an optical recording medium that allows recording and reproduction of information by light, and more particularly, relates to an optical recording medium that allows after-processing to be carried out on the surface thereof.

BACKGROUND ART

An optical recording medium for optically recording information allows high density recording, and shows excellent mobility, and the information recorded therein is not easily deteriorated, therefore, it has been increasingly demanded as the recent information society is further advanced. Such an optical recording medium includes, for example, an optical card, an optical disc such as a CD, a CD-ROM, and a CD-R. Recording and reproducing of the information is carried out using near infrared laser beams and the like.

This optical recording medium typically comprises a transparent protective layer and a substrate, and an optical recording layer held between them. For this transparent protective layer, a polycarbonate resin of a low price, having low water absorption property, which is resistant to warping or cracking and which shows an excellent bend property, has been often used. However, polycarbonate resins have a problem of low scratch resistance. Therefore, when a polycarbonate resin is employed for a transparent protective layer, a cured layer formed from an ion radiation curing type resin having a big curing shrinkage rate has been generally further provided in the past. With this cured layer, the surface of the optical recording medium can be made as hard as, or harder than pencil hardness (defined by JIS-K-5400) H which represents sufficient scratch resistance. In this way, it is intended that the optical recording medium is protected from scratches when it is carried with, or in use, and the durability of the optical recording medium as well as the reliability of the recording and reproducing of the information are improved.

Recently, there has been an increased demand to record an individual information after such an optical recording medium is produced. Examples of the recording of such individual information include, for example, a signature of the card holder, display of the card use status, and recording of various prints and the like, formation of a magnetic recording layer, and formation of a hologram and the like.

In the conventional optical recording medium, the material forming the cured layer for the surface thereof has excellent scratch resistance but inferior adhesion with a printing ink and the like. Therefore design printing, functional printing or magnetic layer formation has been difficult to be carried out on the cured layer. The use of a leveling agent such as silicone for leveling a resin layer of the cured layer deteriorates post-adhesion with the ink. The use of an ionized radiation curable resin having a little curing shrinkage rate can improve adhesion with a printing ink and the like. However, the resulting hardness can only be around F–HB in terms of pencil hardness, and the resulting cured layer has an insufficient scratch resistance disadvantageously. In addition, such a cured layer has poor adhesion with a magnetic recording layer or a hologram even an adhesive agent is employed, and there is the fear that it might come off or be peeled off during use.

The present invention has been developed in view of the above-mentioned problems, and an object of the present invention is to provide an optical recording medium, which allows post-processing such as printing on the cured layer which has been difficult to be carried out so far, without degrading the reliability of the information of the optical recording medium.

DISCLOSURE OF THE INVENTION

The present inventors have found that the above-mentioned problems can be solved unexpectedly by providing a receiving layer which receives the post-processing, on at least a part of the top surface of the cured layer.

Accordingly, the optical recording medium of the present invention comprising at least an optical recording layer is characterized by further comprising a cured layer provided on/over outer surface of the optical recording layer and a receiving layer provided on at least a part of the cured layer.

In a preferred example of the present invention, a transparent protective layer is provided between the optical recording layer and the cured layer, and the cured layer comprises an ionization radiation curable resin. Furthermore the cured layer comprises two or more layers and has such resin configuration that the curing shrinkage rate is increased from the inner-most layer to the outer-most layer, and the pencil hardness of the outer-most layer of the cured layer is H or harder. To the cured layer may be added a leveling agent and the receiving layer may be formed from a urethane type composition or an epoxy type composition.

Between the cured layer and the receiving layer, an anchor layer may be provided, and the receiving layer receives one or more selected from, preferably, TR (thermal melt transfer), ST (sublimation transfer), ink jet, and magnetic recording layer, and a hologram.

BRIEF DESCRIPTION OF THE DRAWINGS

FIG. 6 shows a perspective view of one embodiment of an optical recording medium of the present invention, which is an optical card, in which a receiving layer is provided on a part of a cured layer.

FIG. 7 shows a perspective view of another embodiment of an optical recording medium of the present invention, which is an optical card, in which a receiving layer is provided on a part of a cured layer.

FIG. 8 shows a perspective view of one embodiment of an optical recording medium of the present invention, which is an optical card, in which a receiving layer is provided on a part of a cured layer and an IC module is provided on the cured layer side.

FIG. 9 shows a sectional view of the optical card shown in FIG. 8.

FIG. 10 shows a perspective view of one embodiment of an optical recording medium of the present invention, which is an optical card, in which a receiving layer is provided on a part of a cured layer and an IC module is provided on a surface of optical card on which a cured layer is not provided, and a receiving layer is provided on the cured layer side at a position corresponding to the IC module.

FIG. 11 shows a sectional view of the optical card shown in FIG. 10.

FIG. 12 shows a perspective view of one embodiment of an optical recording medium of the present invention, which is an optical card, in which a receiving layer is provided on a part of a cured layer, and a hologram is provided on the receiving layer.

FIG. 13 shows a sectional view of the optical card shown in FIG. 12.

BEST MODE FOR CARRYING OUT THE INVENTION

The present invention will be explained in detail.

Figure 1:
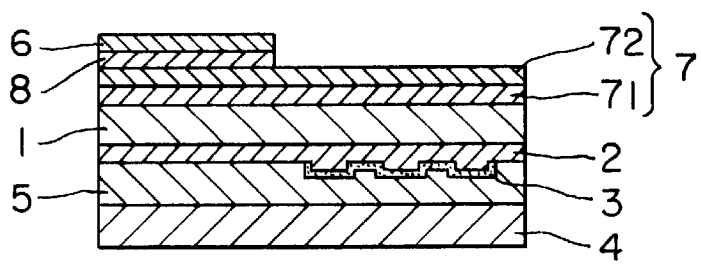
FIG. 1 shows a sectional view of one embodiment of an optical recording medium of the present invention, in which an anchor layer is provided.

FIG. 1 shows a sectional view of one example of an optical recording medium according to the present invention. The optical recording medium in FIG. 1, has a construction in which a patterned layer 2 is provided on the undersurface of a transparent protective layer 1, an optical recording layer 3 is provided to cover the pits and the projections of the patterned layer 2, a substrate 4 having a design print and a magnetic recording layer is laminated onto the undersurface of the optical recording layer 3 via an adhesive layer 5. On the transparent protective layer 1, a cured layer 7 comprising a first layer 71 of the cured layer and a second layer 72 of the cured layer is provided, and an anchor layer 8 and a receiving layer 6 are provided on a part of the cured layer 7.

Figure 2:
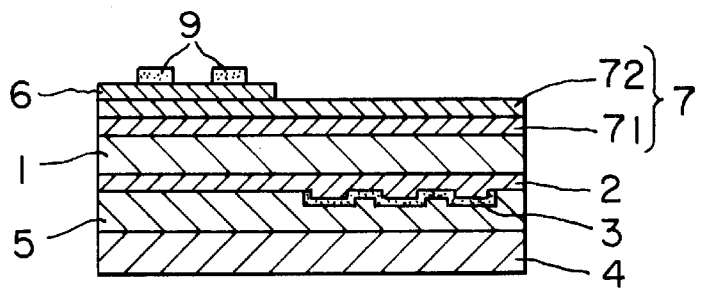
FIG. 2 shows a sectional view of one embodiment of an optical recording medium of the present invention, which is subjected to TR, ST processing.

FIG. 2 shows a sectional view of another example of an optical recording medium according to the present invention which is subjected to TR, ST processing. The optical recording medium in FIG. 2 has a construction wherein a patterned layer 2 and an optical recording layer 3 are provided on the undersurface of a transparent protective layer 1, a substrate 4 is laminated to the undersurface of the optical recording layer 3 via an adhesive layer 5, a cured layer 7 comprising a first layer 71 of the cured layer and a second layer 72 of the cured layer is provided on the transparent protective layer 1, a receiving layer 6 is provided on a part of the cured layer 7 without using an anchor layer therebetween, and TR, ST (OCR) layer 9 is further provided.

In FIG. 1 and FIG. 2, the anchor layer 8 and the receiving layer 6 can be transparent or opaque to visible rays, and when they are transparent, a design print which may be formed on the substrate 4 can be viewed from the side of the receiving layer 6. When at least either anchor layer 8 or receiving layer 6 is opaque to visible rays, on the contrary, the design print and the like printed on the substrate 4 can be concealed.

Receiving Layer

The receiving layer is a layer to impart various functions to the optical recording medium, which allows, for example, after processing by TR, ST, and ink jet, and a hologram 12, or formation of a magnetic recording layer. A material to form the receiving layer is not particularly limited, and examples thereof include various conventionally known resinous materials such as urethane type, epoxy type, acrylic type, and vinyl type materials. Preferable materials are compositions comprising a urethane resin or an epoxy resin. The receiving layer can be formed by silk screen method, off-set method, gravure method and the like. The thickness of the receiving layer can be preferably 3–20 $\mu$m. In the present specification, the receiving layer which allows the recording by ink jet may be particularly referred to as an accepting layer.

Examples of the materials which can be used for TR receiving layer include, for example, a transparent material such as Seiko Advance HAC 800 Medium, Seiko Advance ACT 800 Medium, and an opaque material such as PS611 White produced by Teikoku Ink Co., Ltd. Examples of the material which can be used for ST receiving layer includes, for example, Seiko Advance ACT 800 Medium, Seiko Advance RAM 800 Medium, Seiko Advance VIC 800 Medium, and PS611 white produced by Teikoku Ink Co., Ltd. and the like. Examples of the material which can be used for a receiving layer for a magnetic recording layer include, for example, Seiko Advance HAC 800 Medium, Seiko Advance ACT 800 Medium, and PS611 White produced by Teikoku Ink Co., Ltd. and the like. Examples of the material which can be used for a receiving layer for a hologram include, for example, Seiko Advance HAC 800 Medium, Seiko Advance ACT 800 Medium, and PS611 White produced by Teikoku Ink Co., Ltd. and the like.

Cured Layer.

The cured layer is a layer that can increase the scratch resistance of the surface of the optical recording medium without marring the function thereof. The material is not particularly limited, as far as it has the above-mentioned characteristics, however, examples thereof include resins, preferably ionization radiation curable resins. The cured layer can be composed of one layer, however, it is preferably made of 2 or more layers, wherein the curing shrinkage rate thereof is increased from the innermost layer to the outermost layer. Furthermore preferably, a leveling agent to make the resin flat, preferably an acrylic type leveling agent, is added to the cured layer.

In a preferred embodiment in which the cured layer has multi-layer structure, the first layer (inner layer) 71 of the cured layer out of the cured layer 7 can be formed on the transparent protective layer using an ionization radiation curable resin having a low curing shrinkage rate containing a functional monomer and/or functional oligomer to which a leveling agent, preferably an organic polymer type leveling agent, more preferably, an acrylic leveling agent, is added. Specifically, polyvinyl butyral, low molecular cellulose such as Sharinu Series from Nisshin Chemical Industries, Ltd., Taren, Flowren, Polyflow series by Kyoeisha Oil and Fats Chemical Industries. Ltd., and radial fin type polymer L-20 of Soken Chemical Co., Ltd., and Disparon series of Kusumoto Chemical Co., Ltd. and the like can be used for example.

When a polycarbonate resin is used for the transparent protective layer 1, the above-mentioned functional monomers and/or functional oligomers are combined with N-vinyl pyrolidone as an adhesive imparting agent and a reactive diluting agent, and Irgacur 651, 184 and the like, as an initiator (such as benzoin type, acetophenone type, thioxanthone type, and peroxide type and the like), and furthermore, preferably an organic polymer type leveling agent, more preferably an acrylic leveling agent, can be added to a resin of ionization radiation curable type. Depending on the case, a photoinitiator (amine type, quinone type, and the like), a thermal polymerization inhibitor, a filler (inorganic, organic), a thixotropy imparting agent, a plasticizer and a nonreactive polymer may be added as well.

Here, the ionization radiation curable resin means a resin which can be cured by irradiating various electromagnetic waves and radiation and the like, and a typical example thereof include a UV curable resin.

In a preferred embodiment in which the cured layer has a multi-layer structure, the second layer (outer layer) 72 of the cured layer needs to have high a hardness as the surface layer, and it can be preferably formed using an ionization radiation curable resin having a relatively high curing shrinkage rate comprising tri-functional-penta-functional monomer as the main agent and a small amount of a functional oligomer on the first layer 71 of the cured layer (or an intermediate layer formed on the first layer of the cured layer).

In addition, to the ionization radiation curable resin forming the outermost layer is preferably added an acrylic leveling agent. Specifically, examples thereof include a radial fin type polymer L-20 of Soken Kagaku, and Disparon series of Kusumoto Kasei. By adding the leveling agent, the coatability on the first layer 71 of the cured layer (or on the intermediate layer provide on the first layer of the cured layer) is improved and plane defects are reduced. The addition of the leveling agent can increase the evenness of the cured layer. In the case in which the cured layer comprises multiple layers, a leveling agent is preferably added to each layer when the layer is formed to increase the evenness and the coatability.

Optical Recording Layer

The optical recording layer is not particularly limited as far as it is a layer that allows stable optical recording/reproduction by beams of light.

As the optical recording layer, not only a generally known metal type recording material such as a tellurium type and a bismuth type, but also a dye type optical recording material such as a phthalocyanine type and a naphthoquinone type can be used. It can be not only written once, read many times type, but also ROM type.

Among these, usually a metal oxide layer of light reflecting type such as an oxide of Te, Sb and Mo, or an organic dye layer of cyanine type, quinone type and phthalocyanine type can be used for the optical recording layer.

IC Module

The IC module is not particularly limited as far as it can be embedded in an optical recording medium. The location in the optical recording medium in the direction of thickness thereof where the IC module is embedded is not particularly limited, and it can be provided on a surface of the optical recording medium on the side where a cured layer is provided. Or, the IC module can be provided on a surface of the optical recording medium where the cured layer is not provided. In such a case, since the access to the IC module is made from the other side of the optical recording plane, a device required for recording and reproducing information can be simplified in some cases. In this case, it is also possible to provide a receiving layer on the cured layer at the position corresponding to the IC module to conceal the IC module so that the back surface of the IC module cannot be viewed from the optical recording side, thereby the optical recording medium has a better appearance.

Transparent Protective Layer

The transparent protective layer is not particularly limited as far as it is a layer which passes a light beam which carries out optical recording/reproduction and which can protect the optical recording layer from the forces excerted from outside, and the like. Normally, it can be formed from a transparent resin material.

A resin used for the transparent protective layer 1 is preferably rich in optical characteristics, specifically, a resin having light transmittance of not less than 90% (780 nm, 830 nm), birefringence of not more than 100 nm (single pass) or optical elastic axis of not more than ±5% is preferably used. Among the resins that are generally used, particularly preferable is a polycarbonate resin (PC) but an acrylic resin having the above-mentioned optical characteristics can be used as well. Specifically, for example, LEXAN film produced by GE and the like can be used. The total thickness of the transparent protective layer and the cured layer 7 is preferably 380±20 $\mu$m.

Patterned Layer

The patterned layer 2 can be formed between the transparent protective layer 1 and the optical recording layer 3. This can be formed by generally known 2 p method (photo polymerization method), injection method, and casting method and the like. When 2 p method is employed for forming the patterned layer 2, UV curable resins are preferably used. In the case wherein injection method or casting method is employed, the same material as that used for the transparent protective layer is preferably used. The interface between the transparent protective layer 1 and the patterned layer 2 can be eliminated, if necessary, by the use of injection method or casting method other than the 2 p method.

Anchor Layer

The anchor layer which is preferably provided according to the present invention is a layer provided between the cured layer and the receiving layer which can be used to improve the adhesion of these and the like. For the anchor layer, known compositions of various resins, such as urethane type, epoxy type, acrylic type and vinyl type resin can be preferably used. Among them, urethane type or epoxy type composition is preferable since it shows excellent adhesion to an ionization radiation curable resin having a relatively high curing shrinkage rate. The anchor layer can be formed by silk screen method, offset method, and gravure method and the like. The thickness of the anchor layer is preferably 3–20 $\mu$m, for example. When the composition for use in the receiving layer 6 shows excellent adhesion with the cured layer 7, the anchor layer 8 may not be provided.

Substrate

The substrate which can be provided according to the present invention is a material which is provided in an ordinary optical recording medium, which holds an optical recording layer, and is shaped into, for example, a card form or a disc form. The material is not particularly limited, but polyvinyl chloride, polyethylene terephthalate, AS, polycarbonate, ABS, and polypropylene and the like can be used.

Adhesive Layer

The adhesive is provided typically between the substrate and the optical recording layer, however, it can be provided between other layers. As the material of the adhesive, conventionally known materials such as urethane type, epoxy type, acrylic type, vinyl type and amide type can be used. The adhesive that is directly in contact with the optical recording layer is preferably a material having high recording sensitivity and excellent temperature humidity suitability.

The optical recording medium of the present invention allows post-processing to a cured layer which has been difficult so far, without degrading the reliability of the information of the optical recording medium.

EXAMPLES

The present invention will be further described based on the following Examples. All amounts, ratios and parts in the Examples are given by weight, unless otherwise indicated.

Example 1

Figure 3:
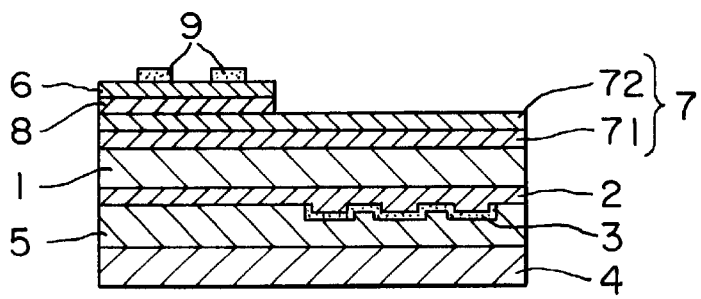
FIG. 3 shows a sectional view of one embodiment of an optical recording medium of the present invention, in which an anchor layer is provided and which is subjected to TR, ST processing.

An extruded polycarbonate resin plate having a size of 200×200 mm, thickness of 0.4 mm as shown in FIG. 3 was used as the transparent protective layer 1, and an ionization radiation curable resin comprising the following composition A was coated on one surface using a Myer bar to give a thickness of 20 μm, then it was irradiated with a UV lamp and cured to give the first layer 71 of the cured layer (curing shrinkage rate of 14%).

Composition A
(ionization radiation curable resin, the first layer of the cured layer)

| | |
|---|---|
| Urethane acrylate oligomer | 80 parts by weight |
| Hexamethylene diacrylate | 10 parts by weight |
| Pentaerythritol triacrylate | 10 parts by weight |
| Pentaerythritol tetraacrylate | 10 parts by weight |
| Dipentaerythritol hexaacrylate | 3 parts by weight |
| N-vinylpyrolidone | 50 parts by weight |
| 1-hydroxycyclohexyl phenyl ketone | 10 parts by weight |
| acrylic type high copolymer | 5 parts by weight |

On the first layer 71 of the cured layer, an ionization radiation curable resin comprising the following composition B was coated with a Myer bar to give a thickness of 5 μm, irradiated with a UV lamp and cured to give the second layer 72 of the cured layer (curing shrinkage rate of 17%). The pencil hardness of the second layer 72 of the cured layer was H.

Composition B
(ionization radiation curable resin, the second layer of the cured layer)

| | |
|---|---|
| Pentaerythritol tetraacrylate | 80 parts by weight |
| pentaerythritol triacrylate | 10 parts by weiqht |
| N-vinylpyrolidone | 25 parts by weight |
| 1-hydroxycyclohexyl phenyl ketone | 5 parts by weight |
| acrylic type high copolymer | 5 parts by weight |

Then on the opposite surface of the transparent protective layer 1 having the cured layer 7 comprising the first layer 71 of the cured layer, and the second layer 72 of the cured layer, was formed a guide track patterned layer 2 using the 2 p method then an optical recording layer 3 was formed by sputtering of TeOx thereon. On the other hand a substrate 4 comprising vinyl chloride sheet and the above-mentioned laminate were adhered using a urethane type adhesive 5.

After the adhesive was cured, an anchor layer 8 was coated on the second layer 72 of the cured layer by mixing HAC 120 white produced by Seiko Advance and HAC curing agent produced by Seiko Advance (urethane type two solution curing type silk ink) at a ratio of 10:1, diluting the same with T-926 solvent, and coating it using a 270-mesh silk screen plate to give a thickness of 5 μm on the cured layer 72.

On the anchor layer 8, a TR receiving layer 6 was formed by mixing Seiko Advance HAC 800 Medium and HAC curing agent produced by Seiko Advance at a ratio of 10:1, diluting it with T-926, then coating it using a 270-mesh silk screen plate to give a thickness of 5 μm on the anchor layer 8.

When Seiko Advance HAC 800 Medium is used for the anchor layer and the receiving layer, a white resin can be used for the anchor layer to promote the transfer to the white resin, and a transparent resin containing no pigment can be used for the receiving layer in a preferred embodiment. However, such difference in usage is not necessary for some kinds of the resins.

After the receiving layer is cured, it was punched out to a card size to form an optical card.

To the thus obtained optical card, data of 100 tracks were recorded then read by an optical card reader/writer on the part where the receiving layer was not formed. The error rate was good as it was not more than $1 \times 10^{-4}$.

The receiving layer 6 of the optical card was subjected to TR processing 9. After the TR processing, the optical card showed no problems in printability and durability and was sufficiently durable for use as a card. The readout of the OCR letters by TR could be carried out well by an OCR reader.

Example 2

Seiko Advance ACT 800 Medium and care 47, an additive, were mixed at 100:1, and diluted with T-912 solvent, and coated to give a thickness of 5 μm on the anchor layer 8 of the optical recording medium of Example 1, using a 270-mesh silk screen plate to form a TR receiving layer 6. An optical card was produced in the way similar to that of Example 1 and data of 100 tracks were recorded then read by an optical card reader/writer on the part where the receiving layer was not formed. The error rate was good as it was $1 \times 10^{-4}$. The receiving layer 6 of the optical card was subjected to TR processing 9. The optical card having subjected to TR processing had no problems in printability and durability and was sufficiently durable for the use as a card. The readout of the OCR letters by TR could be carried out well by an OCR reader.

Example 3

PS611 White produced by Teikoku Ink Co., Ltd. and PS curing agent produced by Teikoku Ink Co., Ltd. were mixed at 10:2, and diluted with c-002 solvent, and coated to give a thickness of 5 μm on the cured layer 72 of the optical recording medium of Example 1, without forming an anchor layer, using a 270-mesh silk screen plate to form a receiving layer 6. An optical card was produced in the way similar to that of Example 1 and data of 100 tracks were recorded then read by an optical card reader/writer on the part where the receiving layer was not formed. The error rate was good as it was $1 \times 10^{-4}$.

The receiving layer 6 of the optical card was subjected to TR printing 9. The optical card having subjected to TR processing had no problems in printability and durability and was sufficiently durable for the use as a card. The readout of the OCR letters by TR could be carried out well by an OCR reader.

The receiving layer 6 of the optical card was subjected to ST processing. The optical card having subjected to ST processing had no problems in printability and durability and was sufficiently durable for the use as a card. The readout of the OCR letters by ST could be carried out well by an OCR reader.

A magnetic recording layer 10 of 650 oersted was provided on the receiving layer 6 of the optical card by heat press. The magnetic layer 10 can be also formed by a silk ink in which a magnetic material is dispersed. Then an optical card was produced in the way similar to that of Example 1. The recording characteristics of the magnetic tape part checked with a magnetic reader/writer were good, showing the same level as that of the conventional magnetic card.

A hologram 12 was provided on the receiving layer 6 of the optical card by heat press. The data recorded in the hologram 12 could be read well by a reader.

Example 4

Seiko Advance ACT 800 Medium and care 47, an additive, were mixed at a ratio of 100:1, and diluted with T-912 solvent, and coated to give a thickness of 5 μm on the anchor layer 8 of the optical recording medium of Example 1, using a 270-mesh silk screen plate to form a ST receiving layer 6. An optical card was produced in the way similar to that of Example 1 and data of 100 tracks were recorded then read by an optical card reader/writer on the part where the receiving layer was not formed. The error rate was good as it was $1 \times 10^{-4}$. The receiving layer 6 of the optical card was subjected to ST processing 9. The optical card having subjected to ST processing had no problems in printability and durability and was sufficiently durable for the use as a card.

The readout of the OCR letters by ST could be carried out well by an OCR reader.

Example 5

Seiko Advance RAM 800 Medium and care 47, an additive, were mixed at 100:1, and diluted with T-976 solvent, and coated to give a thickness of 5 μm on the anchor layer 8 of the optical recording medium of Example 1, using a 270-mesh silk screen plate to form a ST receiving layer 6. An optical card was produced in the way similar to that of Example 1 and data of 100 tracks were recorded then read by an optical card reader/writer on the part where the receiving layer was not formed. The error rate was good as it was $1 \times 10^{-4}$. The receiving layer 6 of the optical card was subjected to ST processing 9. The optical card having subjected to ST processing had no problems in printability and durability and was sufficiently durable for the use as a card. The readout of the OCR letters by ST could be carried out well by OCR reader.

Example 6

Seiko Advance VIC 800 Medium, HAC curing agent produced by Seiko Advance, and care 47, an additive, were mixed at 100:10:1, and diluted with T-926 solvent, and coated to give a thickness of 5 μm on the cured layer 72 of the optical recording medium of Example 1, without forming an anchor layer, using a 270-mesh silk screen plate to form a ST receiving layer 6. An optical card was produced in the way similar to that of Example 1 and data of 100 tracks were recorded then read by an optical card reader/writer on the part where the receiving layer was not formed. The error rate was good as it was $1 \times 10^{-4}$. The receiving layer 6 of the optical card was subjected to ST processing 9. The optical card having subjected to ST processing had no problems in a printability and durability and was sufficiently durable for the use as a card. The readout of the OCR letters by ST could be carried out well by an OCR reader.

Example 7

Seiko Advance ACT 800 Medium and care 47, an additive, were mixed at a ratio of 100:1, and diluted with T-912 solvent, and coated to give a thickness of 5 μm on the anchor layer 8 of the optical recording medium of Example 1, using a 270-mesh silk screen plate to form a receiving layer 6 for a magnetic recording layer.

Figure 4:
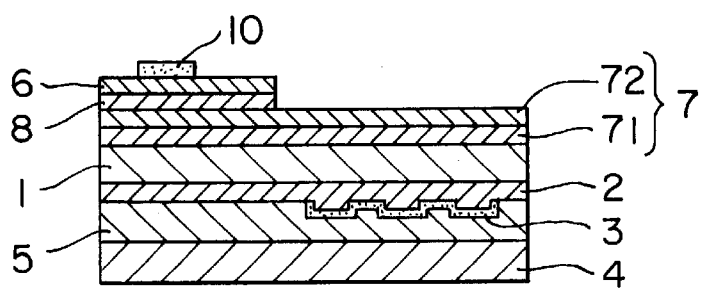
FIG. 4 shows a sectional view of one embodiment of an optical recording medium of the present invention, in which an anchor layer and a magnetic layer are provided.

As shown in FIG. 4, a magnetic layer 10 is formed by heat pressing a magnetic recording layer of 650 oersted on the same receiving layer 6 as that of Example 1. The magnetic layer 10 can be formed by a silk ink in which a magnetic material is dispersed. Then an optical card was produced in the way similar to that of Example 1.

As shown in FIG. 4, in this optical recording medium, a patterned layer 2 is provided on the undersurface of a transparent protective layer 1, an optical recording layer 3 is provided to cover the pits and the projections of the patterned layer 2, and a substrate 4 having a design print and a magnetic recording layer is laminated so as to hold the optical recording layer 3 via an adhesive layer 5. On the transparent protective layer 1, a cured layer 7 comprising the first layer 71 of the cured layer and the second layer 72 of the cured layer is provided, and an anchor layer 8, a receiving layer 6, and a magnetic layer 10 are provided on a part of the cured layer 7.

Recording to and reading from the optical recording part was conducted under the same conditions as that used for Example 1. and the error rate was good as it was not more than $1 \times 10^{-4}$. The recording characteristics of the magnetic recording layer part checked with a magnetic reader/writer were good, showing the same level as that of the conventional magnetic card.

Example 8

PS611 White produced by Teikoku Ink Co., Ltd., PS curing agent produced by Teikoku Ink Co., Ltd. and protein powder were mixed at a ratio of 100:35:30, and diluted with c-002 solvent, and coated to give a thickness of 5 μm on the cured layer 72 of the optical recording medium of Example 1, without forming an anchor layer, using a 270-mesh silk screen plate to form an ink-jet receiving layer, and an optical card was produced in the way similar to that of Example 1.

Then PS000 Medium produced by Teikoku Ink Co., Ltd., PS curing agent produced by Teikoku Ink Co., Ltd. and protein powder were mixed at a ratio of 100:35:30, and diluted with c-002 solvent, and coated to give a thickness of 5 μm on an anchor layer using a 270-mesh silk screen plate to form an ink-jet receiving layer (acceptance layer 11).

An acceptance layer 11 was formed on the same anchor layer 8 as that of Example 1 using a 270-line silk screen plate and a silk ink in which protein powder was dispersed, and an optical card was produced in the way analogous to that of Example 1.

Figure 5:
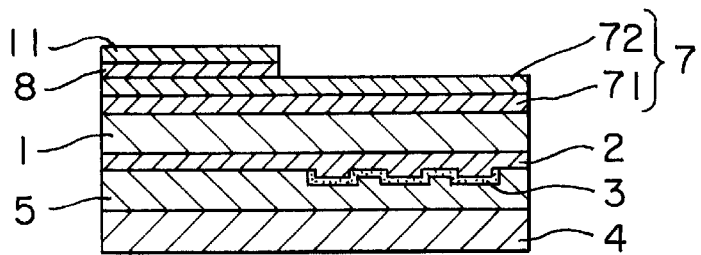
FIG. 5 shows a sectional view of one embodiment of an optical recording medium of the present invention, in which an anchor layer is provided and in which the receiving layer is an inkjet accepting layer.

As shown in FIG. 5, in this optical recording medium, a patterned layer 2 is provided on the undersurface of a transparent protective layer 1, an optical recording layer 3 is provided to cover the pits and the projections of the patterned layer 2, and a substrate 4 having a design print and a magnetic recording layer is laminated so as to hold the optical recording layer 3 via an adhesive layer 5. On the transparent protective layer 1, a cured layer 7 comprising the first layer 71 of the cured layer and the second layer 72 of the cured layer is provided, and an anchor layer 8, an ink-jet receiving layer (accepting layer 11) are provided on a part of the cured layer 7.

Recording to and reading from the optical recording part was conducted under the same conditions as that used for Example 1 and the error rate was good as it was not more than $1 \times 10^{-4}$. The accepting layer 11 was subjected to design printing using an ink-jet printer and it had no problems in printability and durability and was sufficiently durable for the use as a card.

What is claimed is:

1. An optical recording medium comprising at least an optical recording layer, further comprising a cured layer comprising a cured ionization radiation curable resin provided on/over an outer surface of said optical recording layer and a receiving layer provided on at least a part of said cured layer.

2. An optical recording medium according to claim 1, wherein an IC module is provided in said optical recording medium.

3. An optical recording medium according to claim 2, wherein the IC module is provided, with regard to said optical recording layer, on the side where said cured layer is provided.

4. An optical recording medium according to claim 2, wherein the IC module is provided, with regard to said optical recording layer, on the side where said cured layer is not provided, and said receiving layer is provided on said cured layer at the position corresponding to said IC module so that the IC module cannot be viewed from said cured layer side.

5. An optical recording medium according to claim 1, wherein a transparent protective layer is provided between said optical recording layer and said cured layer.

6. An optical recording medium according to claim 1, wherein the pencil hardness of the outer-most layer of said cured layer is H or harder.

7. An optical recording medium according to claim 1, wherein said receiving layer is formed from a two solution curing type urethane composition.

8. An optical recording medium according to claim 1, wherein said receiving layer is one receiving one or more selected from TR, ST, inkjet, a magnetic recording layer and a hologram.

9. An optical recording medium comprising at least an optical recording layer, further comprising a cured layer provided on/over an outer surface of said optical recording layer and a receiving layer provided on at least a part of said cured layer, wherein said cured layer comprises two or more layers and has such resin configuration that the curing shrinkage rate is increased from an inner-most layer to an outer-most layer thereof.

10. An optical recording medium comprising at least an optical recording layer, further comprising a cured layer provided on/over an outer surface of said optical recording layer and a receiving layer provided on at least a part of said cured layer, wherein a leveling agent is added to said cured layer.

11. An optical recording medium according to claim 10, wherein the leveling agent in said cured layer is acrylic high copolymer.

12. An optical recording medium comprising at least an optical recording layer, further comprising a cured layer provided on/over an outer surface of said optical recording layer and a receiving layer provided on at least a part of said cured layer, wherein said receiving layer is formed from a two solution curing type epoxy composition.

13. An optical recording medium comprising at least an optical recording layer, further comprising a cured layer provided on/over an outer surface of said optical recording layer and a receiving layer provided on at least a part of said cured layer, wherein an anchor layer is provided between said cured layer and said receiving layer.

14. An optical recording medium according to claim 13, wherein said anchor layer is formed from a two solution curing type urethane composition.

15. An optical recording medium according to claim 13, wherein the thickness of said anchor layer is 3–20 $\mu$m.

16. An optical recording medium comprising at least an optical recording layer, further comprising a cured layer provided on/over an outer surface of said optical recording layer and a receiving layer provided on at least a part of said cured layer, wherein the thickness of said receiving layer is 3–20 $\mu$m.

* * * * *